Feb. 3, 1970   P. L. ALBRIGHT   3,493,068
ELECTRIC BATTERY IN COMBINATION WITH VEHICLE FRAME
Filed July 5, 1968

INVENTOR
P. L. ALBRIGHT

United States Patent Office 3,493,068
Patented Feb. 3, 1970

3,493,068
ELECTRIC BATTERY IN COMBINATION WITH VEHICLE FRAME
Penrose Lucas Albright, 1523 Woodacre Drive, McLean, Va. 22101
Continuation-in-part of application Ser. No. 504,969, Oct. 25, 1965, now Patent No. 3,391,752, dated July 9, 1968. This application July 5, 1968, Ser. No. 742,606
Int. Cl. B60k 1/04
U.S. Cl. 180—65                                      5 Claims

ABSTRACT OF THE DISCLOSURE

An electrical battery powered transportation means wherein the batteries, including the electrodes, are integrated into the vehicle's lower structural members and thereby provide a lower center of gravity for the vehicle than would otherwise be the case.

CROSS-REFERENCES TO RELATED APPLICATION

This is a continuation-in-part application of application Ser. No. 504,969, filed Oct. 25, 1965, issued as U.S. Patent No. 3,391,752, effective July 9, 1968.

BACKGROUND OF THE INVENTION

There has been considerable recent interest in electrically powered vehicles. They are cleaner and less noisy in operation than conventional fuel powered vehicles. However, a major problem with electrically powered vehicles lies in the low power to weight ratio. This is solved, at least in part, by batteries designed to function as structural members as taught by the above-mentioned U.S. Patent No. 3,391,752. Even so, unless expensive battery materials are used, the resulting vehicle is relatively heavy for reasonable range and power requirements. This, in turn, necessitates a heavy duty suspension system and larger and more expensive tires. With the present state of the battery art, a heavier vehicle is probably an inherent limitation and, if the electrically powered vehicle is to be competitive from an economical standpoint with fuel powered vehicles, it is considered that its weight should be minimized insofar as practical while at the same time, if possible, utilizing it to the advantage of the vehicle.

SUMMARY OF THE INVENTION

Since, with contemporary batteries of reasonable cost, the electrically powered automobile must include heavy relatively high density batteries, it is considered that the safety of the vehicle can be materially improved by locating the structural battery parts as low as possible, that is, in the frame of the automobile. In so doing, it is advantageous to match the chassis of the vehicle having such a battery-frame to a body assembly designed for a conventional fuel powered vehicle so that essentially the same body is employed on both the fuel and electrically powered vehicles. If desired, the weight borne by the suspension system may be reduced by directly powering each wheel (or each rear wheel) with an electric motor mounted on the wheel. Also, if desired, such a vehicle may carry in its motor compartment a fuel motor operated generator unit of say 10–30 H.P. capacity for charging the batteries when other means is not available or for augmenting the power requirements in extended cross-country trips.

BRIEF DESCRIPTION OF THE DRAWINGS

Other objects, adaptabilities and capabilities will appear as the description progresses, reference being had to the accompanying drawing, in which.

DESCRIPTION OF THE PREFERRED EMBODIMENT

The frame 10 constitutes, in effect, a large Edison nickle-iron type battery. This type battery is preferred because it is relatively inexpensive, is sturdy, has a life expectancy about the same as that of the vehicle, and is operable within a relatively wide range of temperature conditions. Nickel-cadmium type batteries are also suitable, but are substantially more costly. Silver-zinc type batteries, although operable within the ambit of the invention, are presently so expensive as to limit their application as a frame 10 to special-use vehicles.

Figure 1:
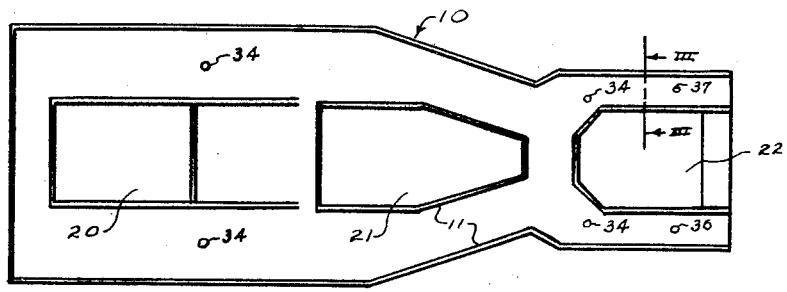
FIGURE 1 is a plan view of the frame of the invention.
Figure 2:
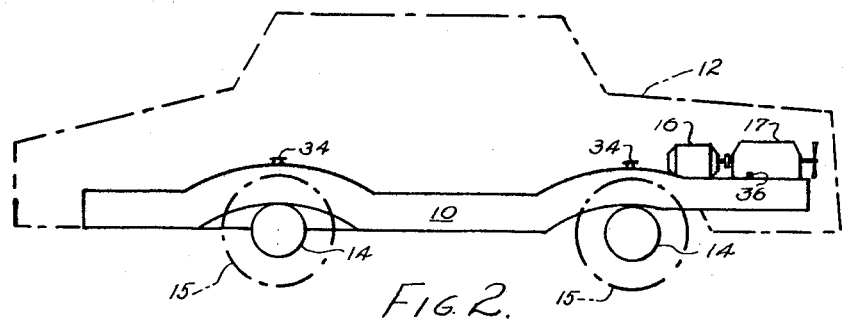
FIGURE 2 is an elevational view of the frame shown in FIGURE 1 showing also the locations of the electric motors and generator.
Figure 3:
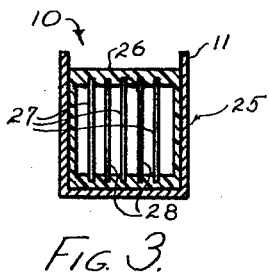
FIGURE 3 is a sectional view taken through lines III—III of FIGURE 1.

Flange 11, which is part of the frame 10, provides means for affixing the body 12 (shown in dot-dash lines) to the chassis where bolting or the like is desired. It will be noted from FIGURE 3 that the flange 11 is part of a steel casing 25. A non-conductive liner 26, composed of nylon, hard rubber, epoxy or other suitable material, is rigidly affixed to casing 25. Liner 26 functions as a connection between the casing 25, on one hand, and the negative plates 27 and positive plates 28, on the other, whereby such plates rigidly are conected to casing 25 and contribute to the strength of frame 10 as a whole. Negative plates 27 each comprise a nickel-plated steel frame containing perforated steel pockets filled with finely divided iron oxide. The positive plates 28 comprise a nickel-plated steel frame onto which are securely mounted perforated steel tubes filled with alternate layers of nickel hydroxide and pure metallic nickel plate. The battery portions may be segmented as desired. Also vent caps 34 are provided as needed. Each segment has it negative plates 28 conected to a negative terminal 37 and its positive plates connected to a positive terminal 36. These in turn connect through control means (not shown) as would occur to one skilled in the art, to motors 14 which each are connected to an adjacent wheel 15 shown in dot-dash lines. Preferably, motors 14 are of a known type which charge the batteries when the vehicle is decelerating thus providing electric dynamic braking. Motors 14 may be mounted on frame 10 and drive the wheels 15 through universal joints or mounted on wheels 15 and drive same through planetary gears.

In order for the vehicle to travel extended distances, or to charge the battery constituted by frame 10, a generator 16 driven by a fuel motor 17 may be provided.

It will be noted that the frame 10 has openings 20, 21 and 22 in the central portion so that the substantial weight of the frame 10 is concentrated in the peripheral portions of the vehicle. This tends to make the vehicle less likely to roll over because more turning force is necessary to overcome the inertia of the frame 10 with its weight so distributed. By placing the weight of the battery in the frame 10, the vehicle's center of gravity is substantially lowered so that the vehicle is more resistant to being overturned in any event. This safety feature is augmented by locating motors 14 under frame 10 adjacent wheels 15.

Having thus described my invention, what I claim as new and desire to secure by Letters Patent of the United States is:

1. A frame for supporting the body of an electrically driven wheeled transportation vehicle, said frame essentially comprising a battery and being heavy relative to the remainder of the vehicle, said frame being substantially all disposed in the lower portion of the vehicle whereby the vehicle has a relatively low center of gravity.

2. A frame in accordance with claim 1 wherein said frame includes electrodes which are firmly attached thereto and constitute strength contributing parts of the frame.

3. A frame in accordance with claim 1 wherein the weight of said frame is essentially concentrated at the sides of said vehicle.

4. A frame in accordance with claim 3 having at least two electric motors supported thereon at its sides.

5. A frame in accordance with claim 3 having four wheels connected thereunder and supporting said frame by suspension means, there being four electric motors on said wheels disposed relative to the sides of said frame.

References Cited

UNITED STATES PATENTS

| 310,724 | 1/1885 | Rogers. | |
|---|---|---|---|
| 473,871 | 4/1892 | Gardner | 180—55 |
| 629,079 | 7/1899 | Hunter | 180—65 |
| 650,014 | 5/1900 | Kitsee | 180—65X |
| 1,831,071 | 11/1931 | Jones | 180—65X |

LEO FRIAGLIA, Primary Examiner

M. L. SMITH, Assistant Examiner

U.S. Cl. X.R.

105—51